US012000152B1

(12) United States Patent
Shokri

(10) Patent No.: US 12,000,152 B1
(45) Date of Patent: *Jun. 4, 2024

(54) STAIR NOSE MOLDING, AND METHOD AND APPARATUS FOR MAKING A STAIR NOSE MOLDING

(71) Applicant: Shahrokh Shokri, Alexandria, VA (US)

(72) Inventor: Shahrokh Shokri, Alexandria, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/357,047

(22) Filed: Jul. 21, 2023

Related U.S. Application Data

(63) Continuation-in-part of application No. 18/308,732, filed on Apr. 28, 2023, now Pat. No. 11,859,389.

(51) Int. Cl.
*E04F 11/16* (2006.01)
*B29C 53/04* (2006.01)
*B32B 3/04* (2006.01)
*E04F 11/104* (2006.01)
*E04F 15/10* (2006.01)

(52) U.S. Cl.
CPC .......... *E04F 11/166* (2013.01); *E04F 15/105* (2013.01)

(58) Field of Classification Search
CPC ....... E04F 11/17; E04F 11/166; E04F 15/105; E04F 11/104; E04F 11/1042; E04F 11/1045; E04F 2011/1046; E04F 2011/1048; E04F 11/108; E04F 11/112; E04F 11/163; E04F 11/175; E04F 15/107; B29C 53/02; B29C 53/04; B29C 53/043; B29C 53/06; B29C 53/063; B29C 63/04; B32B 3/02; B32B 3/04

USPC .......................................................... 52/179
See application file for complete search history.

(56) References Cited

U.S. PATENT DOCUMENTS

| | | | | |
|---|---|---|---|---|
| 3,668,033 A | * | 6/1972 | Evans | B27D 1/08 156/499 |
| 4,478,664 A | * | 10/1984 | Elias | B29C 63/04 156/216 |
| 4,744,846 A | * | 5/1988 | Pflug | B32B 29/00 264/516 |
| 9,399,874 B2 | | 7/2016 | Spielman | |
| 9,920,536 B2 | | 3/2018 | Marhevka, Jr. | |
| 10,941,575 B2 | | 3/2021 | Raine | |
| 11,002,028 B2 | | 5/2021 | Rus | |
| 11,111,676 B2 | | 9/2021 | Nedza | |

(Continued)

*Primary Examiner* — William V Gilbert
(74) *Attorney, Agent, or Firm* — The Law Office of Kevin McDermott, P.L.L.C.

(57) ABSTRACT

A method of making a stair nose molding is provided that includes obtaining a flooring plank. The flooring plank includes a core layer, a padding layer covering the core layer, a first edge and a second edge. Moreover, the method includes milling the padding layer along the first edge of the flooring plank, heating the flooring plank, and positioning the first edge of the flooring plank against a first side of the molding member. Furthermore, the method includes bending the flooring plank about a curved end of the molding member to create a curved part of the flooring plank, positioning a remaining part of the flooring plank adjacent a second side of the molding member, and applying pressure to the remaining part of the plank adjacent the second side of the molding member and to the part of the plank adjacent the first side of the molding machine.

8 Claims, 6 Drawing Sheets

(56) References Cited

U.S. PATENT DOCUMENTS

| | | |
|---|---|---|
| 11,326,351 B2 | 5/2022 | Raine |
| 11,332,941 B2 | 5/2022 | Bodendorf et al. |
| 11,486,156 B2 | 11/2022 | Rus |
| 2002/0189177 A1 | 12/2002 | Eve et al. |
| 2014/0174005 A1 | 6/2014 | Richard et al. |
| 2021/0010272 A1 | 1/2021 | Bodendorf et al. |
| 2021/0254345 A1* | 8/2021 | Douglass ............... B26D 3/085 |
| 2021/0362384 A1* | 11/2021 | Padgett ............. B29C 45/14467 |
| 2022/0381038 A1 | 12/2022 | Bremer et al. |
| 2023/0020659 A1 | 1/2023 | Iannacone, III |

\* cited by examiner

STAIR NOSE MOLDING, AND METHOD AND APPARATUS FOR MAKING A STAIR NOSE MOLDING

CROSS REFERENCE TO RELATED APPLICATIONS

This is a continuation-in-part application of U.S. patent application Ser. No. 18/308,732, filed Apr. 28, 2023, the entire disclosure of which is incorporated herein by reference.

TECHNICAL FIELD

This invention relates generally to stair nose moldings, and more particularly, to a stair nose molding and a method and apparatus for making a stair nose molding.

BACKGROUND

Stair nose moldings are typically installed on stair treads to enhance the appearance and durability of the stairs to extend their useful life. Part of a stair nose molding typically surrounds the nose of a stair tread while the remaining part of the molding can extend along the tread.

It is known to use luxury vinyl plank (LVP) and planks made from other materials as flooring. However, the thickness and color of flooring planks typically does not match that of stair nose moldings. For example, known stair nose moldings installed on the top stair typically do not match the thickness of the flooring planks on the top floor such that the flooring does not continue smoothy from the stairs to the top floor. Additionally, the color of the stair nose moldings typically does not match the flooring planks because they may be made in different factories or at different times.

Currently used stair nose moldings are known to fit poorly on stair noses so they detract from a natural appearance. Additionally, due to the poor fit caulking and other corrective measures are known to be required during installation to provide a satisfactory appearance.

Thus, it would be advantageous and an improvement over the relevant technology to provide a stair nose molding, and a method and apparatus for making a stair nose molding capable producing a stair nose molding that matches the color and thickness of flooring planks and enhances the natural appearance of stairs.

SUMMARY OF THE INVENTION

An aspect of the present invention provides a method of making a stair nose molding including the step of obtaining a flooring plank that includes a core layer and a padding layer covering the core layer. The flooring plank include a first edge and a second edge. Moreover, the method includes the steps of milling the padding layer along the first edge of the flooring plank, heating the flooring plank, and positioning the first edge of the flooring plank against a first side of the molding member. The molding member includes the first side, a second side and a curved end. Furthermore, the method includes the steps of bending the flooring plank about the curved end of the molding member to create a curved part of the flooring plank, positioning a remaining part of the flooring plank adjacent the second side of the molding member, and applying pressure to the remaining part of the flooring plank adjacent the second side of the molding member and to the part of the flooring plank adjacent the first side of the molding machine.

In an embodiment of the present disclosure, the heating step includes heating the flooring plank to within a range of about one hundred eighty degrees to two hundred degrees Fahrenheit.

In another embodiment of the present disclosure, the bending step causes the curved part of the flooring plank to include a stair nose molding for installation on a stair.

In yet another embodiment of the present disclosure, the flooring plank is cooled with air.

In another embodiment of the present disclosure, the flooring plank is removed from the molding member.

In another embodiment of the present disclosure, the molding member is made from at least one of metal, wood and plastic.

In yet another embodiment of the present disclosure a stair nose molding is created from the flooring plank. The stair nose molding includes an elongated part integrally formed with a curved part. The stair nose molding includes a core layer and a padding layer, the core layer includes a first surface and a second surface, and the padding layer covers part of one of the surfaces.

In another aspect of the present disclosure, a stair nose molding is provided that includes an elongated part integrally formed with a curved part, a core layer and a padding layer. The core layer includes a first surface and a second surface, and the padding layer covers part of one of the surfaces.

In an embodiment of the present disclosure, the curved part of the stair nose molding has a radius for fitting the stair nose molding over a stair nose.

In another embodiment of the present disclosure, the curved part of the stair nose molding is tangential to the elongated part at a point of curvature.

In yet another embodiment of the present disclosure, the curved part of the stair nose molding is integrally formed with a second elongated part, and the curved part of the stair nose molding is tangential to the second elongated part at a point of curvature.

In yet another aspect of the present disclosure, an apparatus is provided that includes a molding member having a first side, a second side and a curved end, and a spacer fixed to the first side of the molding member. Moreover, the apparatus includes a translating member having a first side, a second side and a pressing member. The pressing member is fixed to the first side of the translating member. The translating member moves towards and away from the first side of the molding member. Furthermore, the apparatus includes a rotating member that rotates towards and away from the second side of the molding member.

A first end of a flooring plank is pressed against the first side of the molding member by the pressing member, a middle part of the flooring plank is bent around the curved end of the molding member, and a remaining part of the flooring plank is pressed against the second side of the molding member by the rotating member.

In an embodiment of the present disclosure, the apparatus includes at least one clamp applied against an outside surface of the translating member and an outside surface of the rotating member.

In another embodiment of the present disclosure, the apparatus includes a first base member fixed to the first side of the molding member at a second end of the molding member, and a second base member fixed to the second side of the molding member at the second end of the molding member, and the rotating member is hingedly attached to the second base member.

In yet another embodiment of the present disclosure, the apparatus includes a screw extending through the molding member, the spacer, and the translating member, and a bolt fitted to an end of the screw. When the bolt is tightened the translating member moves towards the first side of the molding member and the pressing member presses against the flooring plank to force the flooring plank against the first side of the molding member.

In another embodiment of the present disclosure, the pressing member has a surface parallel to the first side of the molding member.

In another embodiment of the present disclosure, the molding member is made from at least one of metal, wood and plastic.

In yet another embodiment of the present disclosure a stair nose molding is created from the flooring plank. The stair nose molding includes an elongated part integrally formed with a curved part. The stair nose molding includes a core layer and a padding layer, the core layer includes a first surface and a second surface, and the padding layer covers part of one of the surfaces.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various exemplary embodiments of the present invention. The following description includes various details to assist in that understanding, but these are to be regarded as merely examples. Accordingly, those of ordinary skill in the art will recognize that various changes and modifications of the examples described herein can be made without departing from the spirit and scope of the present disclosure.

The terms and words used in the following description and claims are merely used to enable a clear and consistent understanding of the present invention. Accordingly, it should be apparent to those skilled in the art that the following description is provided for illustration purposes only, and not for the purpose of limiting the present invention as defined by the appended claims and their equivalents.

Figure 1:
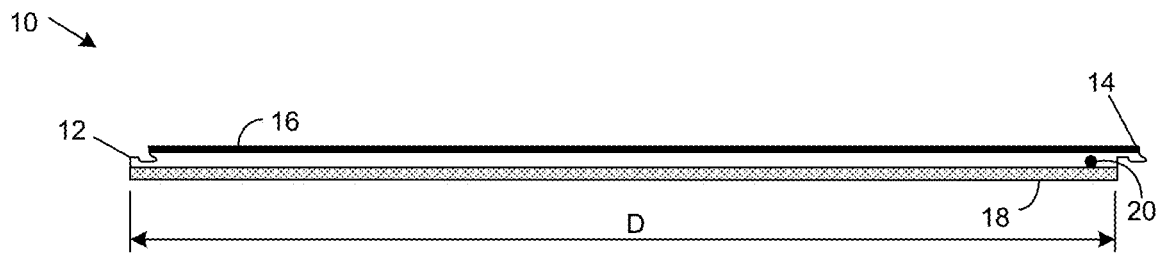
FIG. 1 is a diagram illustrating the cross-section of a known luxury vinyl plank (LVP)

FIG. 1 is a diagram illustrating the cross-section of a known luxury vinyl plank 10. More specifically, the luxury vinyl plank (LVP) 10 includes a first edge 12, a second edge 14, a top layer 16, a bottom padding layer 18 and a core layer 20 between the top 16 and bottom 18 layers. The first edge 12 includes a groove and the second edge 14 includes a protrusion or tongue.

The top layer 16 can include an image and a clear coating. The image may be wood of a certain color. The bottom padding layer 18 can be any type of padding material, for example, rubber or cork. The core intermediate layer 20 may be a stone polymer or a wood plastic composite material. The distance between the first edge 12 and the second edge 14 is D. During installation the groove of the first edge 12 and the tongue of the second edge 14 of adjacent planks 10 snap-fit together in order to securely connect adjacent planks 10 together.

Figure 2:
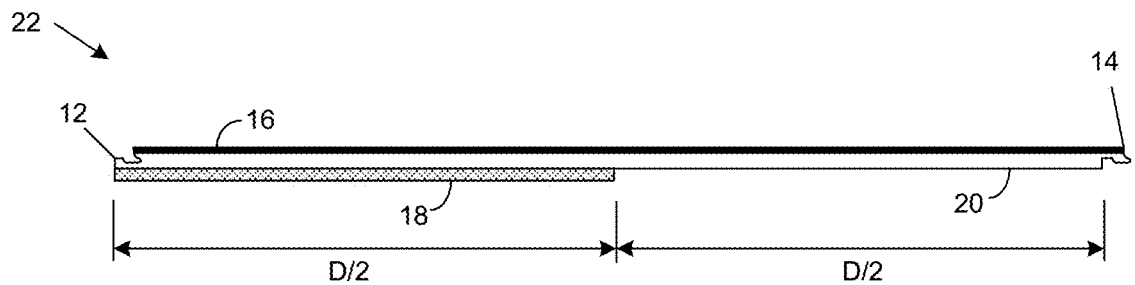
FIG. 2 is a cross-section of a modified flooring plank made from the LVP shown in FIG. 1.
Figure 3:
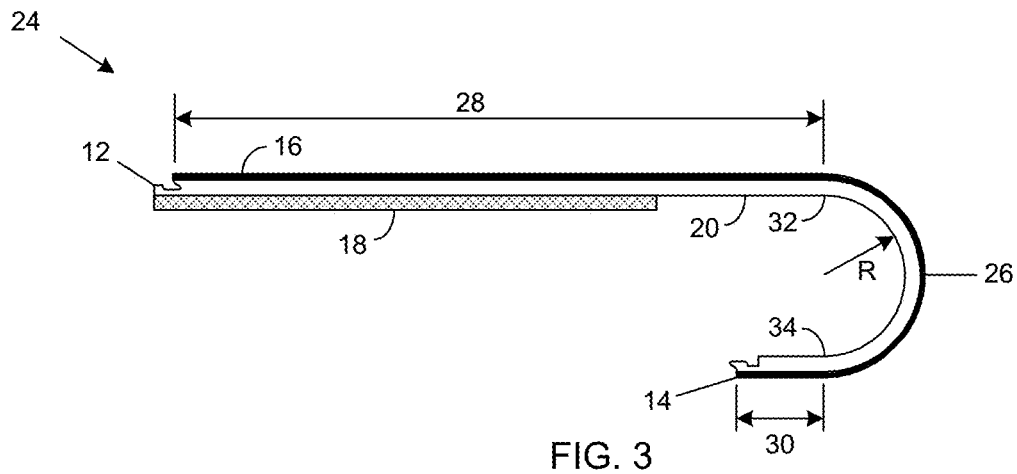
FIG. 3 is a cross-section of an example stair nose molding for matching the color and thickness of flooring planks according to an embodiment of the present disclosure.
Figure 4:
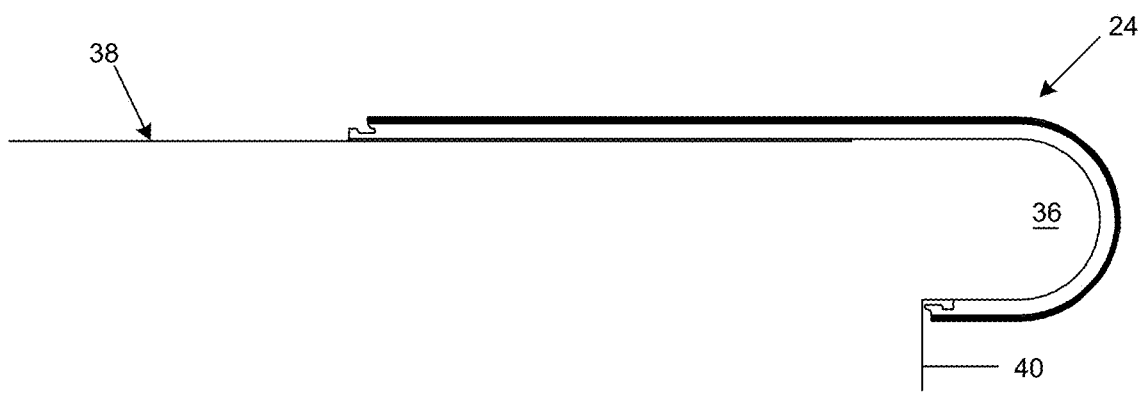
FIG. 4 is a diagram illustrating the nose stair molding shown in FIG. 3 installed on the nose and tread of a stair.

The example flooring planks illustrated in FIGS. 2, 3 and 4 are similar to the flooring plank illustrated in FIG. 1. As such, features illustrated in FIGS. 2, 3 and 4 that are identical to features illustrated in FIG. 1 are identified using the same reference numerals used in FIG. 1.

FIG. 2 is a cross-section of a modified flooring plank 22 made from the luxury vinyl plank 10 shown in FIG. 1. However, the bottom padding layer 18 has been removed over about half (D/2) of the distance D as measured from the first edge 12. Alternatively, the bottom padding layer 18 may be removed for any distance from the first edge 12, or from the second edge 14 of the plank 10 that facilitates making a stair nose molding as described herein. For example, the bottom padding layer 18 may be removed one-third (D/3) of the distance of D from the first edge 12 of the plank 10. The bottom padding layer 18 may be removed from the plank 10 by shaving or milling to expose the core layer 20.

FIG. 3 is a cross-section of an example stair nose molding 24 for matching the color and thickness of flooring planks according to an embodiment of the present disclosure. The stair nose molding 24 is similar to the modified flooring plank 22 shown in FIG. 2. However, the stair nose molding 24 includes a curved part 26 along the second edge 14. The curved part 26 may have a semicircular shape having a radius R. It is contemplated by the present disclosure that the radius R may be sized so the curved part 26 can fit snugly over the nose of any stair. For example, the radius R may be within a range of one-quarter of an inch (¼") to one half an inch (½").

The stair nose molding 24 includes a first length 28, the curved part 26, and a second length 30. The first length 28 is tangent to the curved part 26 at a first point of curvature 32 and the second length 30 is tangent to the curved part 26 at a second point of curvature 34. The first length 28 and the second length 30 may be parallel to each other.

FIG. 4 is a diagram illustrating the stair nose molding 24 installed on the nose 36 and tread 38 of a stair. A stair riser 40 extends below the stair nose molding 24.

Figure 5:
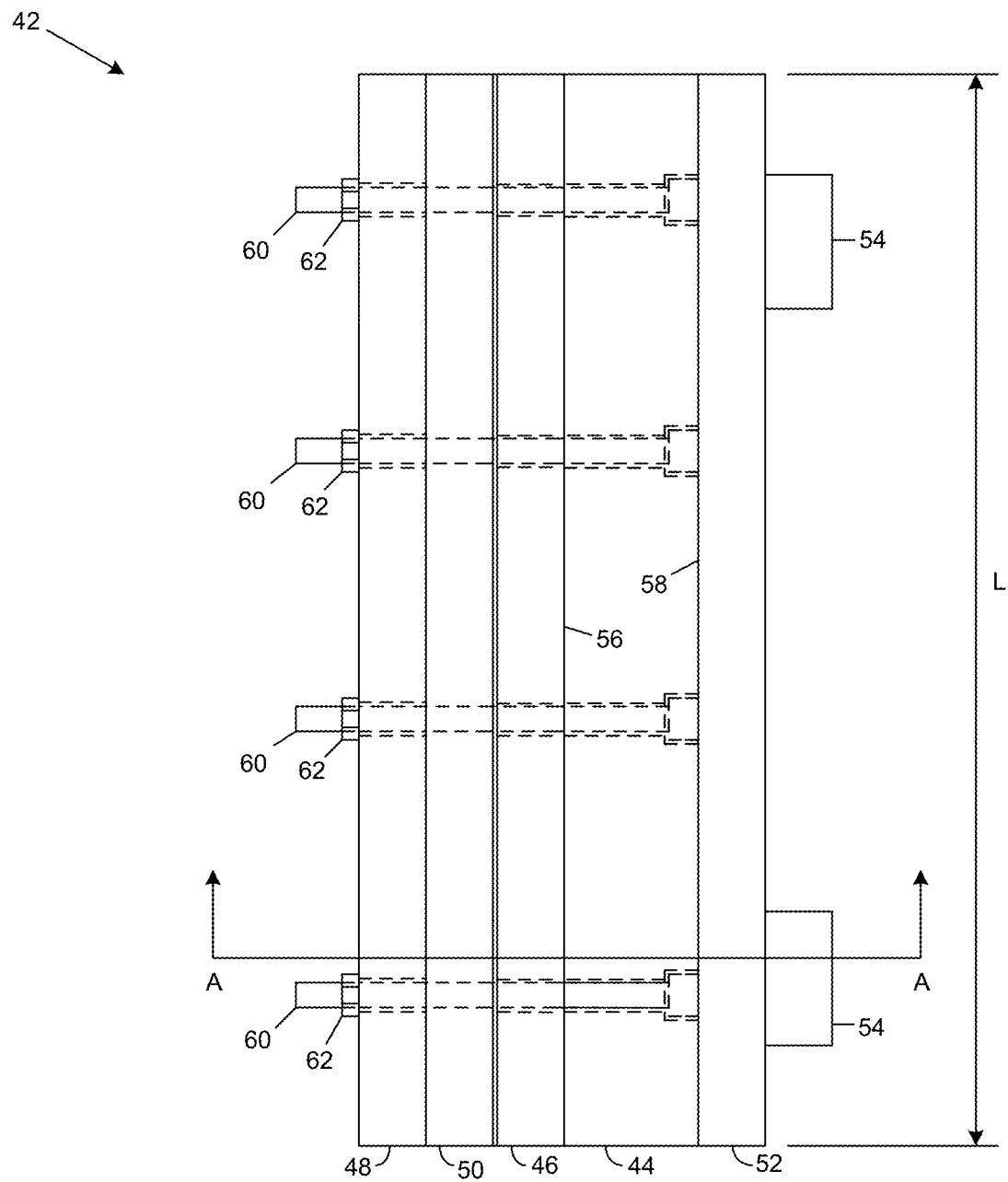
FIG. 5 is a diagram illustrating a top view of an example molding machine for making the example stair nose molding including section line A-A according to an embodiment of the present disclosure.

FIG. 5 is a diagram illustrating a top view of an example molding machine 42 for making the example stair nose molding 24 according to an embodiment of the present disclosure. More specifically, the molding machine 42 includes a molding member 44, a spacer 46, a translating member 48, a pressing member 50, and a rotating member 52. The molding member 44, spacer 46, translating member 48, pressing member 50, and rotating member 52 can be the same length L or can be different lengths. Two connecting elements 54 may be used to connect the rotating member 52 to the molding member 44. Alternatively, any number of connecting elements 54 may be used that facilitates securely connecting the rotating member 52 to the molding member 44.

The molding member 44 includes a first side 56 and a second side 58. The spacer 46 is fixedly connected to the first side 56 of the molding member 44, for example, by screws and bolts (not shown). The translating member 48 is connected to the first side 56 of the molding member 44 using screws 60. A bolt 62 is attached to each screw 60. As the bolts 62 are tightened, the translating member 48 moves towards the first side 56 of the molding member 44. Conversely, as the bolts 62 are loosened the translating member 48 moves away from the first side 56 of the molding member 44. The pressing member 50 is attached to the translating member 48. As a result, the pressing member 50 translates towards and away from the first side 56 of the molding member 44 with the translating member 48.

Four screws 60 can be used to movably connect the translating member 48 to the molding member 44. The screws 60 may be equally spaced along the length L of the molding member 44 and the translating member 48. It is contemplated by the present disclosure that any number of screws 60 may alternatively be used that facilitates creating a molding machine capable of making stair nose moldings 24 as described herein. For example, five or six screws 60 may alternatively be used.

Figure 6:
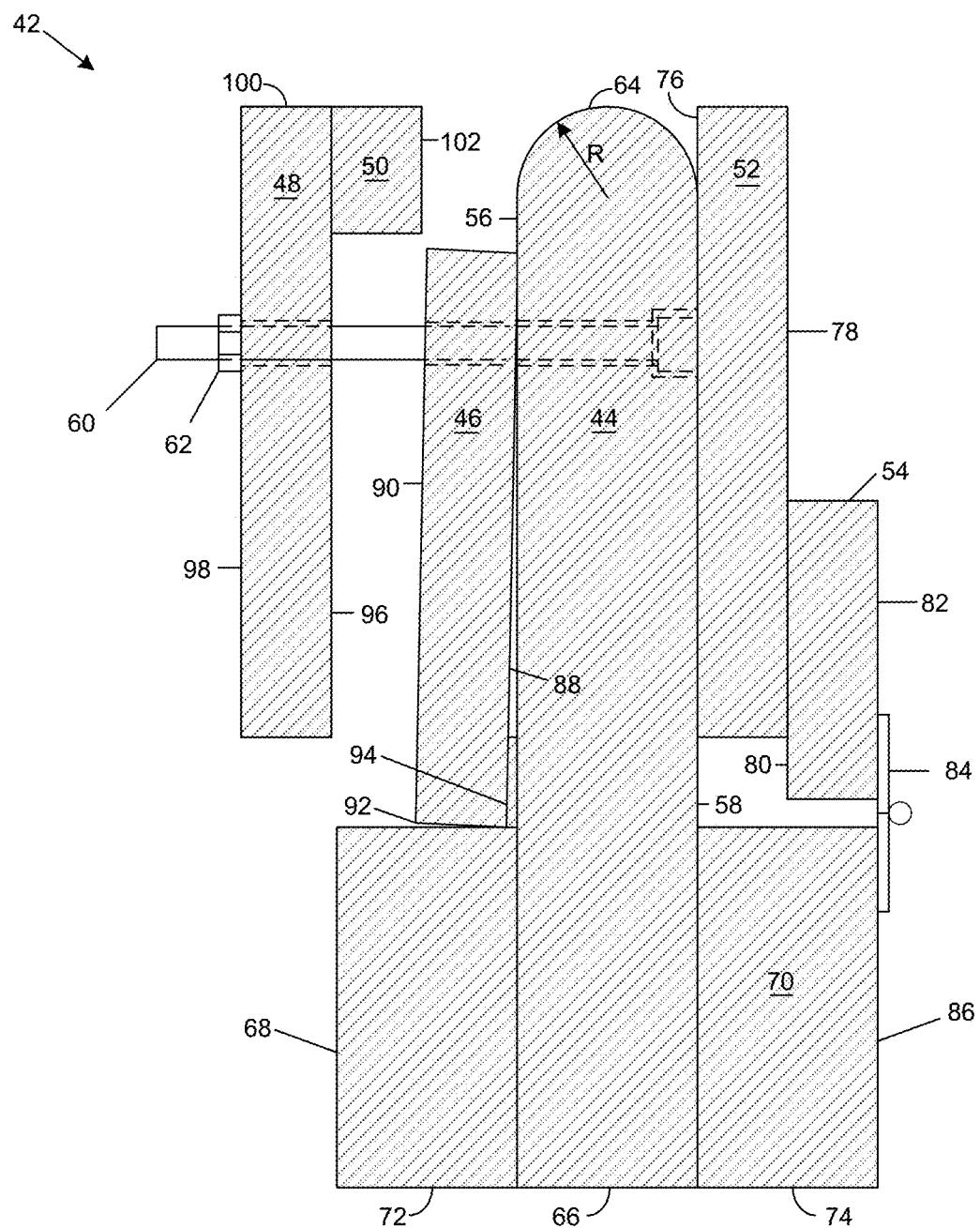
FIG. 6 is diagram illustrating a cross-sectional view of the example molding machine cut along a section line A-A as shown in FIG. 5.

FIG. 6 is a diagram illustrating a cross-sectional view of the molding machine 42 cut along the section line A-A shown in FIG. 5. More specifically, the molding member 44 includes a curved end 64 and a base end 66 in addition to the first side 56 and the second side 58. The curved end 64 can be any type of curve including, but not limited to, a semicircle and an oval. When the curve is a semicircle, the semicircle may have any radius R that matches the nose of a stair. For example, the radius R may be in the range of one-quarter of an inch (¼") to one half an inch (½").

A first base member 68 is attached to the first side 56 of the molding member 44 along a bottom portion of the molding member 44. Additionally, a second base member 70 is attached to the second side 58 of the molding member 44 along the bottom portion of the molding member 44. The first base member 68 has a rectangular cross section and a base 72. The second base member 70 also has a rectangular cross section and a base 74. It is contemplated by the present disclosure that the first 68 and second 70 base members are attached to the first 56 and second 58 sides, respectively, of the molding member 44 along a bottom portion of the molding member 44 such that the base 72, the base 74 and the base end 66 are in the same plane to thus form a base of the molding machine 42. The base members 68 and 70 may be attached to the molding member 44 in any manner including, but not limited to, using screws and bolts (not shown), nails, or an adhesive. The adhesive may be an adhesive used for construction or other industrial applications.

The rotating member 52 has a rectangular cross section, a first side 76 and a second side 78. The connecting elements 54 are attached to the second side 78 along a lower portion of the rotating member 52. The connecting elements 54 also have a rectangular cross section, and have an inner side 80 and an outer side 82. A hinge 84 rotatably connects the second base member 70 to the connecting element 54 and thus to the rotating member 52. More specifically, one flange of the hinge 84 is attached to an outside surface 86 of the second base member 70 and the other flange of the hinge 84 is attached to the outer side 82 of the connecting element 54. As a result of hingedly connecting the connecting element 54 to the second base member 70, the first side 76 of the rotating member 52 can rotate towards and away from the second side 58 of the molding member 44. The first side 76 of the rotating member 52 can be rotated to be parallel to and flush against the second side 58 of the molding member 44.

The spacer 46 has a rectangular cross section, a first side 88, a second side 90, and a bottom side 92. The spacer 46 is attached to the molding member 44 such that the first side 88 of the spacer 46 faces the first side 56 of the molding member 44. A shimming element 94 can be attached to the first side 56 of the molding member 44 at or near the bottom side 92 of the spacer 46. The shimming element 94 is between the first side 56 of the molding member 44 and the first side 88 of the spacer 46. The shimming element 94 may or may not be positioned flush against a top surface of the first base member 68. The top part of the first side 88 of the spacer 46 is positioned against the first side 56 of the molding member 44 but the bottom of the first side 88 is separated from the first side 56 of the molding member 44. The width of the shimming element 94 may vary. For example, the width of the shimming element 94 may be between one eighth of an inch (⅛") and one half an inch (½").

It is contemplated by the present disclosure that the molding machine 42 may alternatively not include the shimming element 94. In such embodiments, the first side 88 of the spacer 46 is flush against the first side 56 of the molding member 44 (not shown). The spacer 46 may be attached to the molding member 44 using, for example, screws, nails screws and bolts, an adhesive, or any combination thereof.

The translating member 48 has a rectangular cross section and has a first side 96, a second side 98, and a top edge 100. The pressing member 50 has a rectangular cross section and is attached to the first side 96 of the translating member at or proximate the top edge 100. A top surface of the pressing member 50 may be in the same plane as the top edge 100 of the translating member 48.

The translating member 48 is movably connected to the molding member 44 using the screws 60. The bolts 62 can press against the second side 98 of the translating member 48. As a result, when the bolts 62 are tightened, each bolt imparts a force on the translating member 48 which causes the translating member 48 to move or translate towards the molding member 44. Conversely, when the bolts 62 are loosened the translating member 48 may move or translate away from the molding member 44.

The pressing member 50 also translates towards and away from the molding member 44 with the translating member 48. Thus, for example, after the bolts 62 have moved far enough along the length of the screw 60 during tightening, a first side 102 of the pressing member 50 can contact the first side 56 of the molding member 44 such that the first side 102 is parallel to the first side 56 of the molding member 44.

Figure 7:
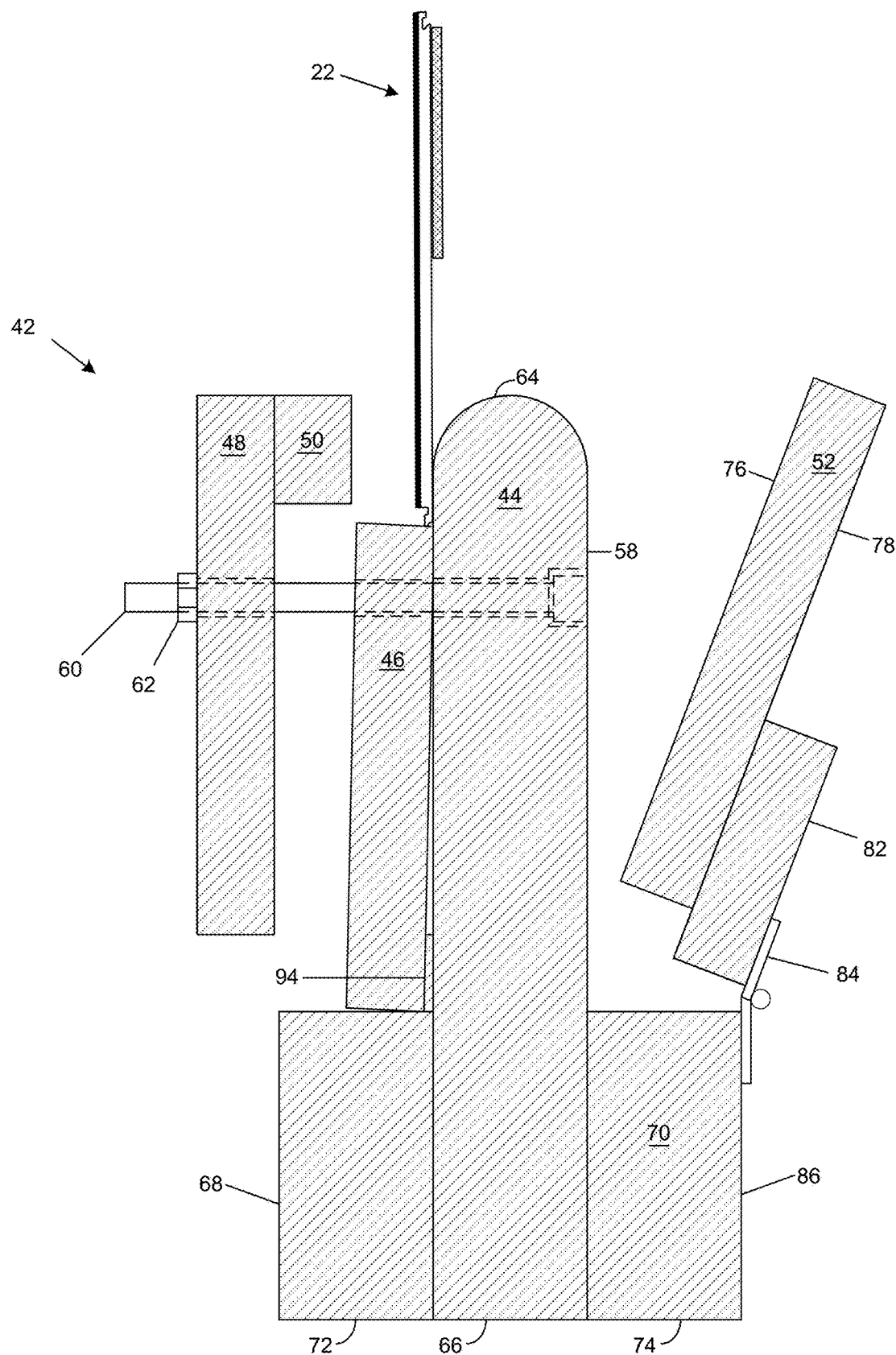
FIG. 7 is diagram illustrating the cross-sectional view of the example molding machine as shown in FIG. 6, further including the modified flooring plank positioned in the molding machine.

The information shown in FIG. 7 is the same information shown in FIG. 6 as described in more detail below. As such, features illustrated in FIG. 7 that are identical to features illustrated in FIG. 6 are identified using the same reference numerals used in FIG. 6.

FIG. 7 is a diagram illustrating the cross-sectional view of the molding machine 42 as shown in FIG. 6 further including the modified flooring plank 22 positioned flush against the first side 56 of the molding member 44. Additionally, the rotating member 52 is rotated away from the molding member 44. The modified flooring plank 22 is positioned in the molding machine 42 to be manipulated and/or otherwise made into the stair nose molding 24.

Before positioning the modified flooring plank 22 in the molding machine 42, the plank 22 should be heated. Heating the flooring plank 22 causes the plank 22 to be more pliable and easier to bend and otherwise manipulated. The plank 22 may be heated to a temperature within the range of one hundred eighty to two hundred degrees Fahrenheit. Alternatively, any temperature or range of temperatures may be used that adequately heats the plank 22 into a pliable state satisfactory for bending and otherwise manipulating the modified flooring plank 22 into the stair nose molding 24.

Figure 8:
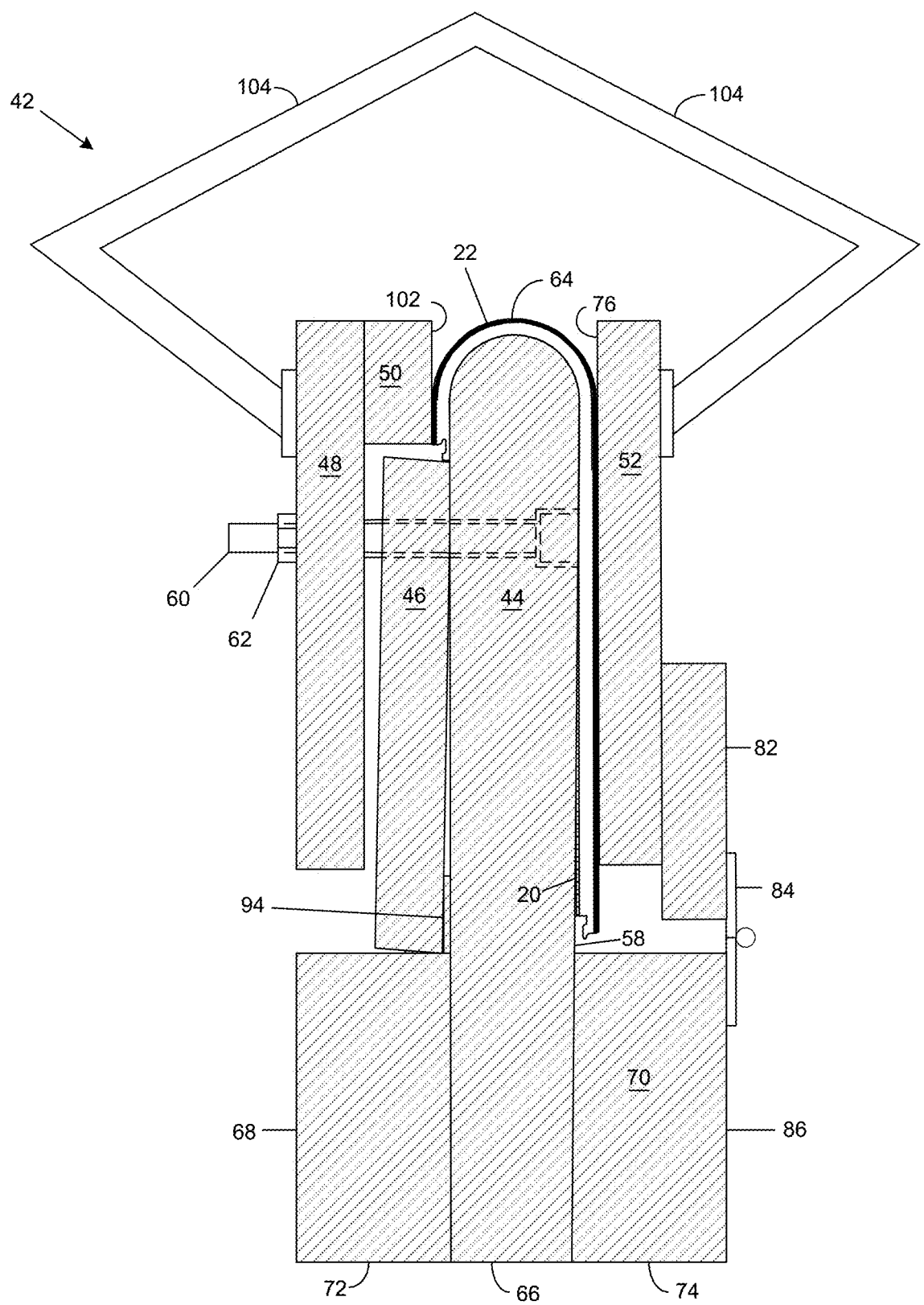
FIG. 8 is a diagram illustrating the cross-sectional view of the molding machine as shown in FIG. 7, while making the stair nose molding.

FIG. 8 is a diagram illustrating the cross-sectional view of the molding machine 42 as shown in FIG. 7 while making the stair nose molding 24 according to an embodiment of the present disclosure. More specifically, after the modified flooring plank 22 is placed against the first side 56 of the molding member 44 the bolts 62 are tightened to cause the translating member 48 and the pressing member 50 to move or translate towards the first side 56 of the molding member 44. However, because the modified flooring plank 22 is positioned against the first side 56 of the molding member 44, the first side 102 of the pressing member 50 presses against the modified flooring plank 22 instead of against the first side 56 of the molding member 44. The pressing member 50 thereby applies pressure to the modified flooring plank 22 which forces the plank 22 against the first side 56 of the molding member 44. As a result, the modified flooring plank 22 is securely held in place between the pressing member 50 and the molding member 44.

Next, the modified flooring plank 22 is bent and/or otherwise manipulated about the curved end 64 such that part of the modified flooring plank 22 fits snugly about the curved end 64 and the remaining part of the flooring plank 22 is roughly parallel to the second side 58 of the molding member 44. The rotating member 52 is rotated such that the first side 76 of the rotating member 52 contacts the modified flooring plank 22.

Next, clamps 104 are applied to the machine 42. More specifically, the arms of the clamps 104 exert a force on the translating member 48 and the rotating member 52. The rotating member 52 in turn presses against, and thus applies pressure to the remaining part of the plank 22 roughly parallel to the second side 58 of the molding member 44. The applied pressure forces the remaining part of the modified plank 22 against the second side 58 of the molding member 44. Thus, the stair nose molding 24 is created from the modified flooring plank 22. After applying pressure from the clamps 104 for a set period of time, the clamps 104 are removed and the stair nose molding 24 is removed from the molding machine 42. The clamps 104 may apply pressure against the translating member 48 and the rotating member 52 for any period of time that facilitates quickly making the stair nose molding 24 as described herein, for example, between one and five minutes. The stair nose molding 24 may be air cooled while in the molding machine 42 before being removed.

Any number of clamps 104 may be positioned along the length L of the molding machine 42. For example, four clamps 104 may be positioned along the length L of the molding machine 42.

Figure 9:
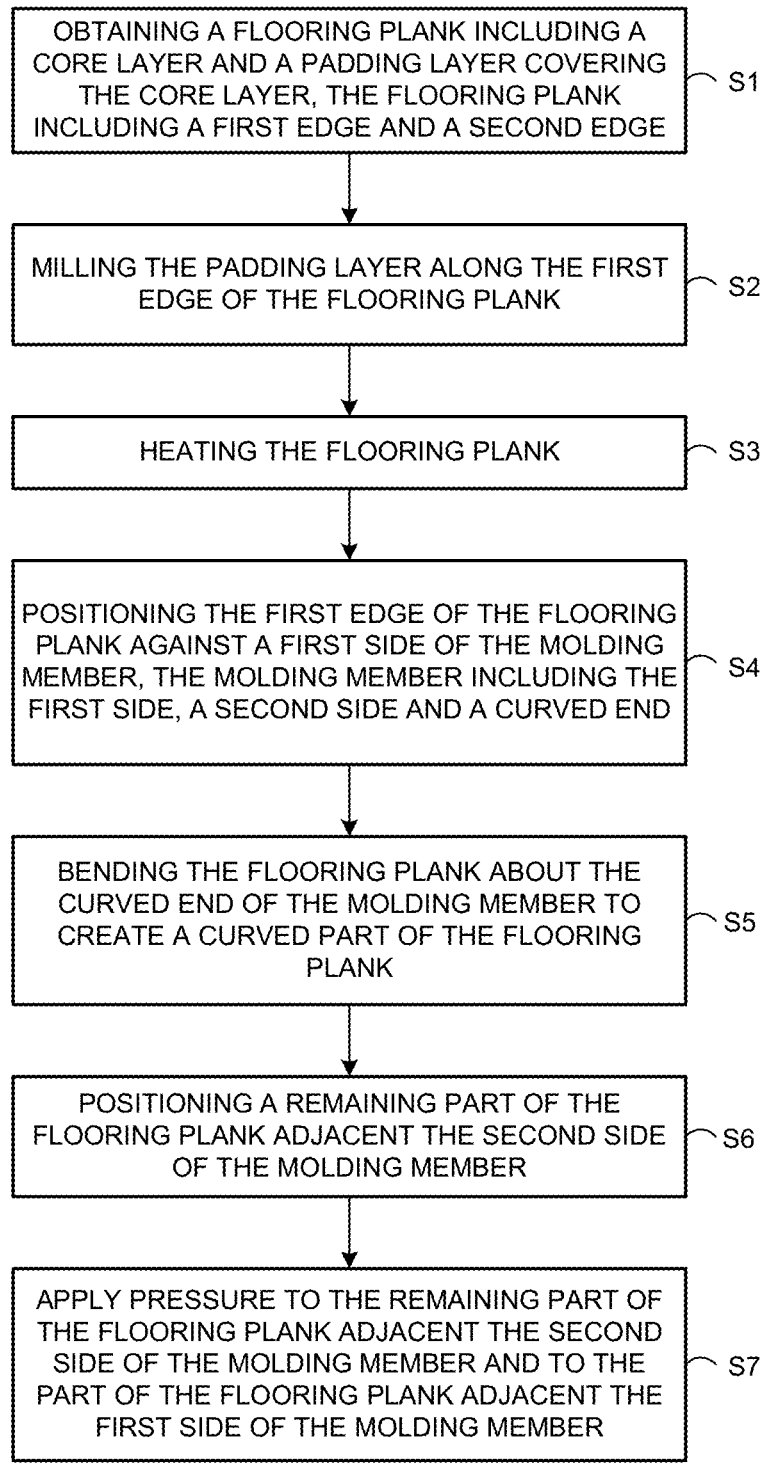
FIG. 9 is a flowchart illustrating an example method for making the stair nose molding according to an embodiment of the present disclosure.

FIG. 9 is a flowchart illustrating an example method for making the stair nose molding 24 according to an embodiment of the present disclosure.

In step S1, a flooring plank is obtained. The obtained flooring plank may be a luxury vinyl plank (LVP) or any other material from which flooring planks may be made. The flooring plank has a core layer 20 and a padding layer 18 covering the core layer 20. The flooring plank can include a first edge 12 and a second edge 14.

Next, in step S2, the padding later 18 is milled off the flooring plank along the first edge 12 of the flooring plank and then, in step S3, the modified flooring plank 22 is heated. Heating the flooring plank 22 causes the plank 22 to be more pliable and easier to bend and otherwise manipulated. The plank 22 may be heated to a temperature within the range of one hundred eighty to two hundred degrees Fahrenheit. Alternatively, any temperature or range of temperatures may be used that adequately heats the plank 22 into a pliable state satisfactory for bending and otherwise manipulating the modified flooring plank into the stair nose molding 24.

Next, in step S4, the first edge of the flooring plank is positioned against the first side 56 of the molding member 44. More specifically, after the modified flooring plank 22 is placed against the first side 56 of the molding member 44 the bolts 62 are tightened to cause the translating member 48 and the pressing member 50 to move or translate towards the first side 56 of the molding member 44. However, because the modified flooring plank 22 is positioned against the first side 56 of the molding member 44, the first side 102 of the pressing member 50 presses against the modified flooring plank 22 instead of against the first side 56 of the molding member 44. The pressing member 50 thereby applies pressure to the modified flooring plank 22 which forces the plank 22 against the first side 56 of the molding member 44. As a result, the modified flooring plank 22 is securely held in place between the pressing member 50 and the molding member 44.

In step S5, the flooring plank 22 is bent about the curved end 64 of the molding member 44 to create the curved part 26 of the flooring plank. More specifically, the modified flooring plank 22 is bent and/or otherwise manipulated about the curved end 64 such that part of the modified flooring plank 22 fits snugly about the curved end 64 and, in step S6, the remaining part of the flooring plank 22 is positioned roughly parallel to the second side 58 of the molding member 44. The rotating member 52 is rotated such that the first side 76 of the rotating member 52 contacts the modified flooring plank 22.

In step S7, pressure is applied to the remaining part of the flooring plank 22 adjacent the second side 58 of the molding member 44 and to the part of the flooring plank adjacent the first side 56 of the molding member 44. More specifically, clamps 104 are applied to the machine 42. Arms of the clamps 104 exert a force on the translating member 48 and the rotating member 52. The rotating member 52 in turn presses against, and thus applies pressure to the remaining part of the plank 22 roughly parallel to the second side 58 of the molding member 44. The applied pressure forces the remaining part of the modified plank 22 against the second side 58 of the molding member 44. Thus, the stair nose molding 24 is created from the modified flooring plank 22. After applying pressure from the clamps 104 for a set period of time, the clamps 104 are removed and the stair nose molding 24 is removed from the molding machine 42. The clamps 104 may apply pressure against the translating member 48 and the rotating member 52 for any period of time that facilitates quickly making the stair nose molding 24 as described herein, for example, between one and five minutes. The stair nose molding 24 may be air cooled while in the molding machine 42 before being removed.

The method for making a stair nose molding described herein enables quickly and economically making a stair nose molding that matches the color and thickness of flooring planks, is easy to install, enhances the natural appearance of stairs, and lengthens the useful life of stairs.

Although the molding member 44, spacer 46, translating member 48, pressing member 50, rotating member 52, and connecting elements 54 are described herein as having rectangular cross sections, alternatively, the molding member 44, spacer 46, translating member 48, pressing member 50, rotating member 52, and connecting elements 54 may have any other cross section that enables the molding machine 42 to create stair nose moldings 24 as described herein, for example, a square cross section.

The molding member 44, spacer 46, translating member 48, pressing member 50, rotating member 52, connecting elements 54, and base members 68 and 70 may be made from any material capable of enabling the molding machine 44 to make stair nose moldings 24 as described herein including, but not limited to, wood, metal, plastic and any combination thereof. Any type of metal may be used including, but not limited to, steel, aluminum, cast iron, and titanium. Any type of plastic may also be used including, but not limited to, polycarbonate, polyvinyl chloride (PVC), and polypropylene. It is contemplated by the present disclosure that different parts of the molding machine 42 may be made of different materials. For example, the base members 68 and 70 may be made from wood; the molding member 44, spacer 46, translating member 48, pressing member 50, rotating member 52, and connecting elements 54 may be made from metal; and, the hinges 84 may be made from plastic. Moreover, different parts of the molding machine 42 may be made of any type of composite material. For example, the pressing member 50 may be made of a wood interior with a metal exterior.

The above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

What is claimed is:

1. A method of making a stair nose molding comprising the steps of:
    obtaining a flooring plank, the flooring plank comprising a core layer and a padding layer covering the core layer, the flooring plank including a first edge and a second edge;
    milling the padding layer along the first edge of the flooring plank;
    heating the flooring plank;
    positioning the first edge of the flooring plank against a first side of a molding member, the molding member including the first side, a second side and a curved end;
    bending the flooring plank about the curved end of the molding member to create a curved part of the flooring plank;
    positioning a remaining part of the flooring plank adjacent the second side of the molding member; and
    applying pressure to the remaining part of the flooring plank adjacent the second side of the molding member and to the part of the flooring plank adjacent the first side of the molding machine member.

2. The method according to claim 1, said heating step comprising heating the flooring plank to within a range of about one hundred eighty degrees to two hundred degrees Fahrenheit.

3. The method according to claim 1, said bending step causing the curved part of the flooring plank to comprise the stair nose molding for installation on a stair.

4. The method according to claim 1, further comprising the step of cooling the flooring plank.

5. The method according to claim 1, said cooling step comprising cooling the flooring plank with air.

6. The method according to claim 1, further comprising the step of removing the flooring plank from the molding member.

7. The method according to claim 1, wherein the molding member is made from at least one of metal, wood and plastic.

8. The method according to claim 1, wherein the stair nose molding is created from the flooring plank and comprises, an elongated part integrally formed with the curved part.

\* \* \* \* \*